Figure 1:
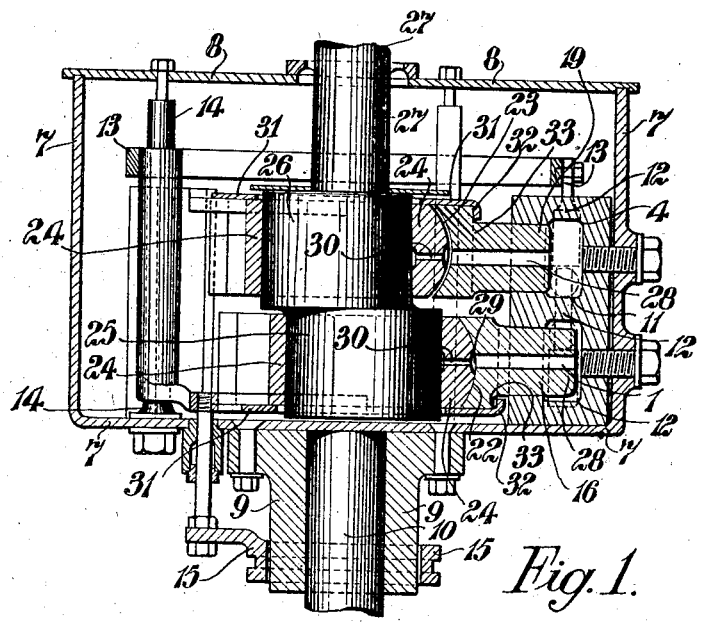

Dec. 2, 1924.

A. COATS

HYDRAULIC CLUTCH

Filed Jan. 3, 1921

1,517,343

3 Sheets—Sheet 1

Inventor
Allan Coats
By B. Drieger
atty.

Dec. 2, 1924.

A. COATS 1,517,343

HYDRAULIC CLUTCH

Filed Jan. 3, 1921

3 Sheets-Sheet 2

Inventor-
Allan Coats.
By B. Singer, Atty.

Patented Dec. 2, 1924.

1,517,343

UNITED STATES PATENT OFFICE.

ALLAN COATS, OF CASTLEHEAD, PAISLEY, SCOTLAND.

HYDRAULIC CLUTCH.

Application filed January 3, 1921. Serial No. 434,741.

*To all whom it may concern:*

Be it known that I, ALLAN COATS, a subject of the King of Great Britain, and resident of Castlehead, Paisley, in the county of Renfrew, North Britain, have invented certain new and useful Improvements in Hydraulic Clutches, of which the following is a specification.

The invention relates to hydraulic clutches of the type in which one member carries a plurality of radially-disposed cylinders, separate plungers in which are operated by eccentrics or equivalents on the other member and in which the flow of operating liquid from the cylinders, or between each cylinder of a pair in which the plungers move oppositely, is controlled by a valve which thus controls engagement and disengagement of the clutch.

In clutches of this type, a casing enclosing the whole is filled with the operating liquid, and the invention has for its object to provide means for replenishment of the cylinders with this liquid during their suction stroke, and for adequate and continuous lubrication therewith of the coacting eccentric and plunger parts, and has further for its object to provide for malalignment of the parts.

There may be one series of cylinders lying in or substantially in one plane of rotation, and the plungers of which are operated by one eccentric or equivalent, or there may be two series of cylinders arranged in parallel planes with preferably each pair in the same radial plane and operated by two eccentrics at 180 degrees to one another.

According to the invention each plunger is provided as in certain known constructions with a port or passage communicating with the interior of the cylinder in which it operates and with the surfaces of the eccentric sheave or other equivalent bearing member by which it is operated, and means are provided for admitting oil by way of these ports so as to replenish the cylinders during each suction stroke, pressure oil at the same time having access to the contacting surfaces by way of these ports during the pressure stroke.

In order that there may be free access to these ports during the suction stroke, the plungers either in opposite pairs or each series as a whole, are so loosely interconnected that while their inward and suction strokes are performed by the outward strokes of their neighbours through this interconnection, there is during the suction stroke of each plunger a certain amount of clearance between that plunger and the coacting eccentric part. Thus oil finds its way during the suction stroke to the clearance space between the plunger and the eccentric part, and so, by way of the port in the piston to the cylinder. During the subsequent pressure stroke, oil is forced from the cylinder through the piston passage to the contacting surfaces of piston, eccentric, and brass, and thus effectively maintains their lubrication under load.

Preferably the eccentrics carry brasses adapted to engage the plunger ends. These brasses have faces at right angles to the axes of the plungers, which faces are cylindrical with axes at right angles to the axis of the shaft, and thus compensate for any digression of the cylinders from the true plane of rotation, and ensure that all the contacting surfaces adjust themselves to one another, preventing relative tilting of the bearing surfaces, evenly distributing pressure upon them, and acting in fact as universal joints.

Figure 2:
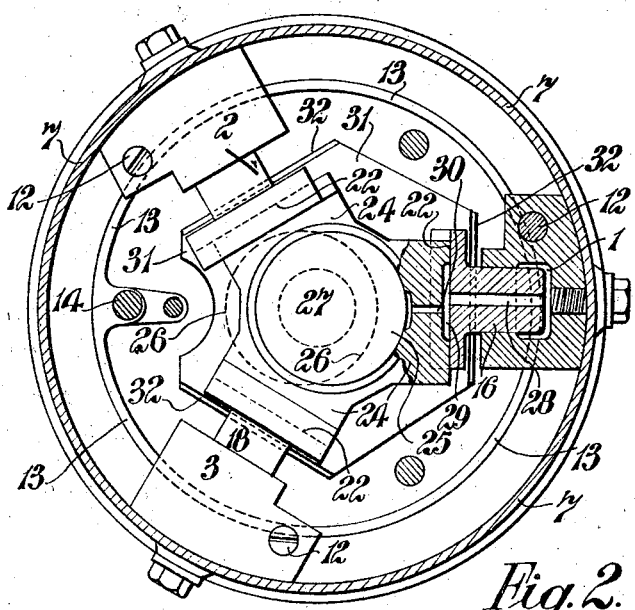
Figure 3:
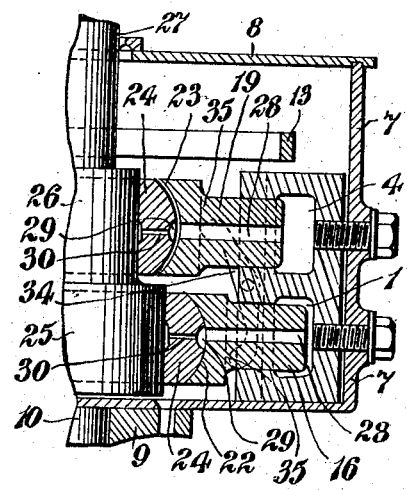
Figure 4:
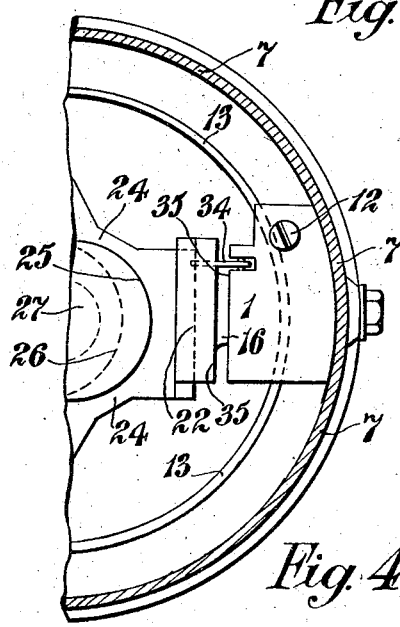
Figure 5:
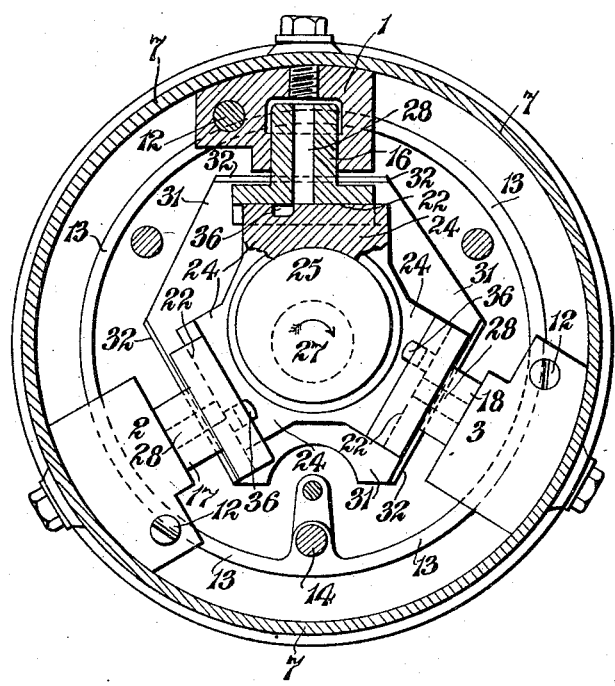

Illustrative examples of the carrying out of the invention, in the case of clutches having two series of cylinders in the same radial plane with the cylinders in each series at 120 degrees to one another and which are operated by two eccentrics at 180 degrees to one another, are shown on three accompanying sheets of drawings, Figures 1 and 2, Sheet 1 being respectively a sectional elevation and a sectional and elevation of one example, Figures 3 and 4, Sheet 2 like views of a second example, while Figure 5, Sheet 3 is a sectional plan of an example embodying an alternative method.

In the example shown in Figures 1 and 2 there are two series of cylinders, there being three cylinders 1, 2, 3, 4, 5, 6, in each series, and corresponding members of each series being in the same radial plane. The cylinders are carried in a casing 7 closed by a cover plate 8 and mounted on a flanged sleeve 9 fixed on the primary shaft 10. The pairs of cylinders are each connected by a passage 11 in which is arranged in known manner a piston valve 12 operatively connected to a spider ring 13 guided on a bolt 14 and operatively connected to a muff 15 loosely embracing the sleeve 9.

In the cylinders are plungers 16, 17, 18, 19, 20, 21 engaging faces 22, 23 on brasses 24 mounted on eccentrics 25, 26 formed on the secondary shaft 27, said brasses being a running fit on said eccentrics and operating as the equivalent of straps. The faces 22, 23 are curved to arcs of cylinders at right angles to the axis of the shaft 27. Axially in the plungers are ports 28 communicating with the cylinder spaces beyond them and with grooves 29 in the surfaces of the brasses 24 from which grooves passages 30 communicate with the surfaces of the eccentrics 25, 26 the grooves 29 being so positioned that they are at no time uncovered.

The plungers 16, 17, 18, 19, 20, 21 are loosely interconnected as shown by spider plates 31 having inturned lips 32 adapted to engage ledges 33 formed on the plungers and loosely embracing the eccentrics 25, 26.

The interconnection of the plungers ensures that the inward suction stroke of each plunger of a series is brought about by the action of the outwardly moving plunger or plungers through the plate 31, but that there is sufficient lag in this action for oil from the casing to enter between the faces of the brasses and of the plungers and by way of the grooves 29 and ports 28 replenish the cylinders. During the pressure stroke oil passes by the passages 30 to the bearing faces of the eccentrics.

Instead of the plungers of each series being interconnected by spider plates 31, the oppositely moving adjacent plungers of two series may, as shown in Figures 3 and 4 be interconnected by levers 34 pivoted between the adjacent cylinders and engaging flats 35 formed on the plungers—the action of such levers being identical with the action of the spider plates.

Instead of clearance permitted by the spiders 31 or by the levers 34 being relied on for admission of oil through the pistons to the cylinders, as shown in Figure 5 there may be provided around the brass 24 a groove 36 for each face 22, 23 which during the inward and suction stroke of the piston coincides with the piston passage 28 and thus forms communication between that passage and the interior of the casing 7 in known manner. The employment of a single groove necessitates the clutch being driven in one direction only, the particular direction being dependent upon which side of the centre of the piston each groove is situated. In the present example the drive is from left to right as indicated by the arrow. The groove 36 shown in Fig. 5 extends laterally across each face 22 of the brasses and partially down one side of the same so as to communicate at this point with the interior of the casing. These grooves are therefore always full of oil.

It is apparent that for proper operation of the clutch the casing 7 must at all times be maintained substantially full of oil. It has, however, been found that there is little tendency to leakage even when the clutch is not rotating, but to ensure tightness, any convenient form of stuffing box or like packing device may be provided between the closure plate 8 and the shaft 27.

What I claim and desire to secure by Letters Patent is:—

1. A hydraulic clutch comprising a liquid filled casing, a plurality of radially disposed cylinders in said casing, separate plungers in said cylinders, ports extending completely through said plungers, a shaft extending through said casing at right angles to said cylinders and adapted when rotated to reciprocate the plungers, means connecting the plungers, and means for automatically placing the inner ends of the plunger ports into communication with the liquid in the casing at the commencement of the suction stroke of each plunger and for closing said ports at the commencement of the pressure stroke of each plunger.

2. A hydraulic clutch comprising a liquid filled casing, a plurality of radially disposed cylinders in said casing, separate plungers in said cylinders, ports extending completely through said plungers, a shaft extending through said casing at right angles to said cylinders and adapted when rotated, to reciprocate the plungers, a spider connecting the plungers, and means for automatically placing the inner ends of the plunger ports into communication with the liquid in the casing at the commencement of the suction stroke of each plunger and for closing said ports at the commencement of the pressure stroke of each plunger.

3. A hydraulic clutch comprising a liquid filled casing, a plurality of radially disposed cylinders in said casing, separate plungers in said cylinders, ports extending completely through said plungers, a shaft extending through said casing at right angles to said cylinders and adapted when rotated, to reciprocate the plungers, means connecting the plungers, and means carried by the said shaft arranged to cooperate with the inner ends of the plungers to open the inner ends of the plunger ports and place said ports automatically into communication with the liquid in the casing at the commencement of the suction stroke of each plunger and to close said ports at the commencement of the pressure stroke of each plunger.

4. A hydraulic clutch comprising a liquid filled casing, a plurality of radially disposed cylinders in said casing, separate plungers in said cylinders, ports extending completely through said plungers, a shaft extending through said casing at right an- gles to said cylinders and adapted when rotated to reciprocate the plungers, means connecting the plungers, and means carried by the said shaft and arranged to cooperate with the inner ends of the plungers to open the inner ends of the plunger ports and place said ports automatically into communication with the liquid in the casing at the commencement of the suction stroke of each plunger and to close said ports at the commencement of the pressure stroke of each plunger.

5. A hydraulic clutch comprising a liquid filled casing, a plurality of radially disposed cylinders in said casing, separate plungers in said cylinders, ports extending completely through said plungers, a shaft extending through said casing at right angles to said cylinders and adapted when rotated, to reciprocate the plungers, means connecting the plungers, eccentrics on said shaft, brasses encircling said eccentrics having peripheral faces arranged to cooperate with the inner ends of the plungers to automatically place the inner ends of the plunger ports into communication with the liquid in the casing at the commencement of the suction stroke of each plunger and to close said ports at the commencement of the pressure stroke of each plunger.

In witness whereof I affix my signature.

ALLAN COATS.